United States Patent
El Khayat et al.

(10) Patent No.: US 9,277,006 B2
(45) Date of Patent: Mar. 1, 2016

(54) PEER-TO-PEER COMMUNICATION OF NON-COMMON DATA

(75) Inventors: Ibtissam El Khayat, Glons (BE); Pierre Lepropre, Bastogne (BE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 179 days.

(21) Appl. No.: 13/510,984

(22) PCT Filed: Mar. 29, 2010

(86) PCT No.: PCT/EP2010/054131
§ 371 (c)(1),
(2), (4) Date: Aug. 16, 2012

(87) PCT Pub. No.: WO2011/063997
PCT Pub. Date: Jun. 3, 2011

(65) Prior Publication Data
US 2013/0204936 A1    Aug. 8, 2013

Related U.S. Application Data

(60) Provisional application No. 61/264,342, filed on Nov. 25, 2009.

(30) Foreign Application Priority Data

Feb. 5, 2010 (WO) .................. PCT/EP2010/051445

(51) Int. Cl.
H04L 29/08    (2006.01)
(52) U.S. Cl.
CPC .............. H04L 67/104 (2013.01); H04L 67/02 (2013.01); H04L 67/108 (2013.01); H04L 67/1063 (2013.01)

(58) Field of Classification Search
None
See application file for complete search history.

(56) References Cited

U.S. PATENT DOCUMENTS

| | | | |
|---|---|---|---|
| 7,734,600 B1 * | 6/2010 | Wise et al. | 707/694 |
| 8,099,476 B2 | 1/2012 | Biderman et al. | |
| 2003/0149975 A1 | 8/2003 | Eldering et al. | |
| 2004/0044727 A1 * | 3/2004 | Abdelaziz et al. | 709/203 |

(Continued)

FOREIGN PATENT DOCUMENTS

EP    2148488 A1    1/2010

OTHER PUBLICATIONS

Lee, T.-C. et al. "Live Video Streaming Using P2P and SVC." Management of Converged Multimedia Networks and Services (lecture notes in Computer Science), Sep. 22, 2008, pp. 104-113, Springer Berlin Heidelberg, Heidelberg, Berlin.

(Continued)

*Primary Examiner* — Chris Parry
*Assistant Examiner* — Stephen Houlihan
(74) *Attorney, Agent, or Firm* — Coats & Bennett, PLLC

(57) ABSTRACT

In individualized data communication of a data entity (200) between peers of a group, the data entity (200) includes at least one common data piece (210) and at least one non-common data piece (220). The at least one common data piece (210) is shared by all peers of the group, whereas the at least one non-common data piece (220) is shared by a subgroup of the group. A non-common data identifier (600) is used to identify the at least one non-common data piece (220). By receiving the non-common data identifier (600), one peer of the group may determine whether another peer of the group is sharing the same non-common data piece (220).

20 Claims, 10 Drawing Sheets

(56) References Cited

U.S. PATENT DOCUMENTS

| | | | |
|---|---|---|---|
| 2004/0107169 A1 | 6/2004 | Lowe | |
| 2004/0156366 A1* | 8/2004 | Walls et al. | 370/394 |
| 2004/0163101 A1 | 8/2004 | Swix et al. | |
| 2005/0183120 A1 | 8/2005 | Jain et al. | |
| 2006/0064383 A1 | 3/2006 | Marking | |
| 2006/0190358 A1 | 8/2006 | Slik | |
| 2007/0183342 A1* | 8/2007 | Wong et al. | 370/252 |
| 2008/0005114 A1 | 1/2008 | Li | |
| 2008/0256243 A1* | 10/2008 | White | 709/226 |
| 2008/0271068 A1 | 10/2008 | Ou et al. | |
| 2009/0005090 A1* | 1/2009 | Hong | 455/466 |
| 2009/0089401 A1 | 4/2009 | Zhang et al. | |
| 2009/0106104 A1 | 4/2009 | Upendran et al. | |
| 2010/0299687 A1* | 11/2010 | Bertino-Clarke | 725/5 |
| 2010/0322213 A1* | 12/2010 | Liu et al. | 370/338 |
| 2011/0078125 A1 | 3/2011 | Perkuhn et al. | |
| 2011/0125849 A1* | 5/2011 | Boyd et al. | 709/204 |
| 2012/0297410 A1 | 11/2012 | Lohmar et al. | |
| 2013/0246352 A1 | 9/2013 | Spurlock et al. | |

OTHER PUBLICATIONS

Cohen, B. "The BitTorrent Protocol Specification." Feb. 28, 2008, pp. 1-9, [retrieved on Jul. 16, 2009]. Retrieved from the Internet: <URL: http://www.bittorrent.org/beps/bep_0003.htm>.

Shen, Y. et al. "Peer-Driven Video Streaming: Multiple Descriptions Versus Layering." Jul. 2005, pp. 1-13, [retrieved on Jun. 2, 2010]. Retrieved from the Internet: <URL: http://cis.poly.edu/{ross/papers/p2pvideo_July05.pdf>.

Cohen, B. "The BitTorrent Protocol Specification." BitTorrent.org, version f61df4010379f5c40090a9b77b73e57db7045dee, created Jan. 10, 2008, pp. 1-6 <http://www.bittorrent.org/beps/bep_0003.html>.

Theory.org Wiki "BitTorrentSpecification." Bittorrent Protocol Specification v1.0, last modified Sep. 26, 2014, pp. 1-5 <https://wiki.theory.org/BitTorrentSpecification>.

Website link <http://www.hulu.com/>, accessed on Oct. 8, 2014, pp. 1-6.

Website link <http://www.bittorrent.com>, accessed on Oct. 8, 2014, pp. 1-4.

Blackburn, J. et al. "A Simulation Study of a New Green BitTorrent." Communications Workshops, 2009, ICC Workshops 2009, IEEE International Conference on. IEEE, 2009. pp. 1-6.

Johansen, D. et al. "DAVVI: A Prototype for the Next Generation Multimedia Entertainment Platform." Proceedings of the 17th ACM International Conference on Multimedia, ACM, 2009, pp. 989-990.

Hoschka, P. "Towards Video on the Web with HTML5." Web, Semantic, W3C URL:<http://www.w3.org/2001/sw> (2009).

Pantos, R. "HTTP Live Streaming draft-pantos-http-live-streaming-02." Informational, Internet-Draft, Oct. 5, 2009, pp. 1-21.

Vidal, C. "Facebook einrichten, Teil III: Link auf das eigene Facebook-Profil." May 19, 2009, pp. 1-4, XP055062060.

Author Unknown. "How to make encrypted links?" Jul. 6, 2007, pp. 1-3, XP055062073 <http://www.webdeveloper.com/forum/showthread.php?153688-How-to-make-encrypted-links>.

Author Unknown. "Here is the image you requested (see the explanation below)" Published Jun. 16, 2002, Retrieved from the Internet Sep. 4, 2014, XP055113023 <http:///www.mcfedries.com/JavaScript/boilerplate2.asp>.

McFedries, P., "Here is the image you requested (see the explanation, below):", webpage, archived, Jun. 16, 2002, p. 1, retrieved on Sep. 16, 2014, retrieved from internet: http://web.archive.org/web/20020616125103/http://www.mcfedries.com/JavaScript/boilerplate2.asp.

GTK-GNUTELLA Development, "Chapter 4. Searching for files", Manual; XP055211863; Retrieved from the internet: URL: https://web.archive.org/web/20070515105112/http://gtk-gnutella.sourceforge.net/manual/searching.html; [retrieved on Nov. 6, 2015]; May 15, 2007; pp. 1-2.

* cited by examiner

```
.
.
.
INFO

LENGTH:            XXXXX
NAME:              YYYYY
PIECE LENGTH:      ZZZZ
PIECES:            SHA1(P1)SHA(P2)...SHA1(B)...SHA1(P10)
.
.
.
```

FIG. 3A

```
.
.
.
INFO

LENGTH:            XXXXX
NAME:              YYYYY
PIECE LENGTH:      ZZZZ
PIECES:            SHA1(P1)SHA1(P2)...SHA1(G)...SHA1(P10)
.
.
.
```

FIG. 3B

```
.
.
.
INFO

LENGTH:            XXXXX
NAME:              YYYYY
PIECE LENGTH:      ZZZZ
PIECES:            SHA1(P1)SHA1(P1)...PH...SHA1(P10)
.
.
.
```

FIG. 4

PEER-TO-PEER COMMUNICATION OF NON-COMMON DATA

TECHNICAL FIELD

The present invention relates to techniques for communication of non-common data using a peer-to-peer (P2P) mechanism.

BACKGROUND

Digital distribution of data, e.g. multimedia content, has been gaining more and more attention over the recent years. In this respect, it is known to distribute data on the basis of a descriptive file, also referred to as a metafile. Examples of such descriptive files are, e.g. a torrent file as used according to the BitTorrent protocol and a playlist file as used according to the HTTP Live streaming protocol. Typically, a recipient of the data will use information in the descriptive file as a basis for obtaining the data. Such information may be identifiers uniquely associated with pieces of the data to be received. Actual reception of the data may then occur from different sources, e.g. according to a P2P protocol. One example of a P2P protocol is the above-mentioned BitTorrent protocol.

In P2P protocols, content is shared among all users that are part of a P2P network. This content may therefore also be referred to as common content. For this purpose, a descriptive file may be provided for every content item available in the network. In this respect, "available" means that at least one member of the network, also referred to as a "peer", is offering this content item. In the descriptive file, small pieces of the content item are addressed. When a user requests a certain content item, these pieces may be served from different members of the network. This has the advantage that the recipient of the content item does not have to rely on certain peers providing the pieces to be online the whole time until the content item is received completely. Every piece may be served from the most suitable location, e.g. from a location to which there is a data connection with low latency and high bit rate.

According to known P2P techniques, the descriptive file of a content item contains references to data pieces shared by all peers of a group, typically in the form of hash values of the different data pieces. This means that each data piece can be obtained from every peer of the group, once it becomes available at this peer. However, in some situations it may also be desirable that a content item is "individualized" for certain peers of the group. In such a case, the content item will include common data pieces which are shared by all peers of the group, and non-common data pieces which are shared by only some peers of the group. This may result in a peer trying to obtain a non-common data piece from another peer which is not sharing this non-common data piece. On the other hand, reducing the group of peers to include only peers sharing the same non-common data pieces, which means that they are receiving the same individualized content item, is often undesirable since it may result in a rather small group of peers and inefficient usage of the P2P mechanisms. For example, when distributing software a large portion of a content item may be the same for most recipients, but there may be differences with respect to some portions of the software, e.g. language packs, architecture-specific portions, or the like. Another example is multimedia content which is individualized by personalized advertisements. In each case, it is desirable to keep the group of participating peers as large as possible, thereby allowing for an efficient distribution of the common content.

Accordingly, there is a need for techniques which allow for efficiently communicating non-common data within a larger group of peers sharing the same common content.

SUMMARY

According to an embodiment of the invention, a method is provided. The method has the purpose of communicating a data entity in a group of peers. The data entity comprises at least one common data piece shared by all peers of the group and at least one non-common data piece shared by a subgroup of the group of peers. According to the method, a non-common data identifier is received. The non-common data identifier is associated with at least one of the peers and configured to identify the at least one non-common data piece. On the basis of the non-common data identifier it is determined whether the at least one of the peers associated with the non-common data identifier belongs to the subgroup sharing the non-common data piece.

According to a further embodiment of the invention, a device is provided. The device includes a non-common data logic configured to accomplish steps of the above-mentioned method.

BRIEF DESCRIPTION OF THE DRAWINGS

FIGS. 3A and 3B illustrate examples of descriptive files.

FIG. 4 illustrates an example of a descriptive file according to an embodiment of the invention.

DETAILED DESCRIPTION

In the following, the invention will be explained in more detail by referring to exemplary embodiments and to the accompanying drawings. The illustrated embodiments relate to techniques for individualized communication of a data entity in a group of peers. More specifically, the group of peers may include one or more subgroups of the peers which are intended to receive individualized versions of the data entity. That is to say, one portion of the data entity will be the same for all peers of the group, and another portion of the data entity will be individual for each subgroup. Accordingly, the data entity may include at least one common data piece which is shared by all peers of the group, and at least one non-common data piece which is shared only by a subgroup of the group of peers. In this respect, "sharing" of a data piece by a peer is intended to cover that the data piece is actually available at the peer and that the peer is attempting to obtain the data piece, but the data piece is not yet available at the peer. The data entity may include different types of content. For example, the data entity may include multimedia content which is individualized by advertisements or extra scenes, e.g. censored scenes or scenes of an extended version of the multimedia content. According to another example, the data entity may include software which includes individualized modules, e.g. different language modules. The techniques as described herein may be applied in various types of communication networks, e.g. in a mobile communication network according to the 3GPP (Third Generation Partnership Project) technical specifications. The techniques may also be applied in wired networks, e.g. by internet providers. The following description will more or less focus on the example of using the BitTorrent protocol, as one example of a P2P protocol, for communicating the data. However, it is to be understood that the concepts as described herein may also be applied with other types of P2P protocols.

Figure 1:
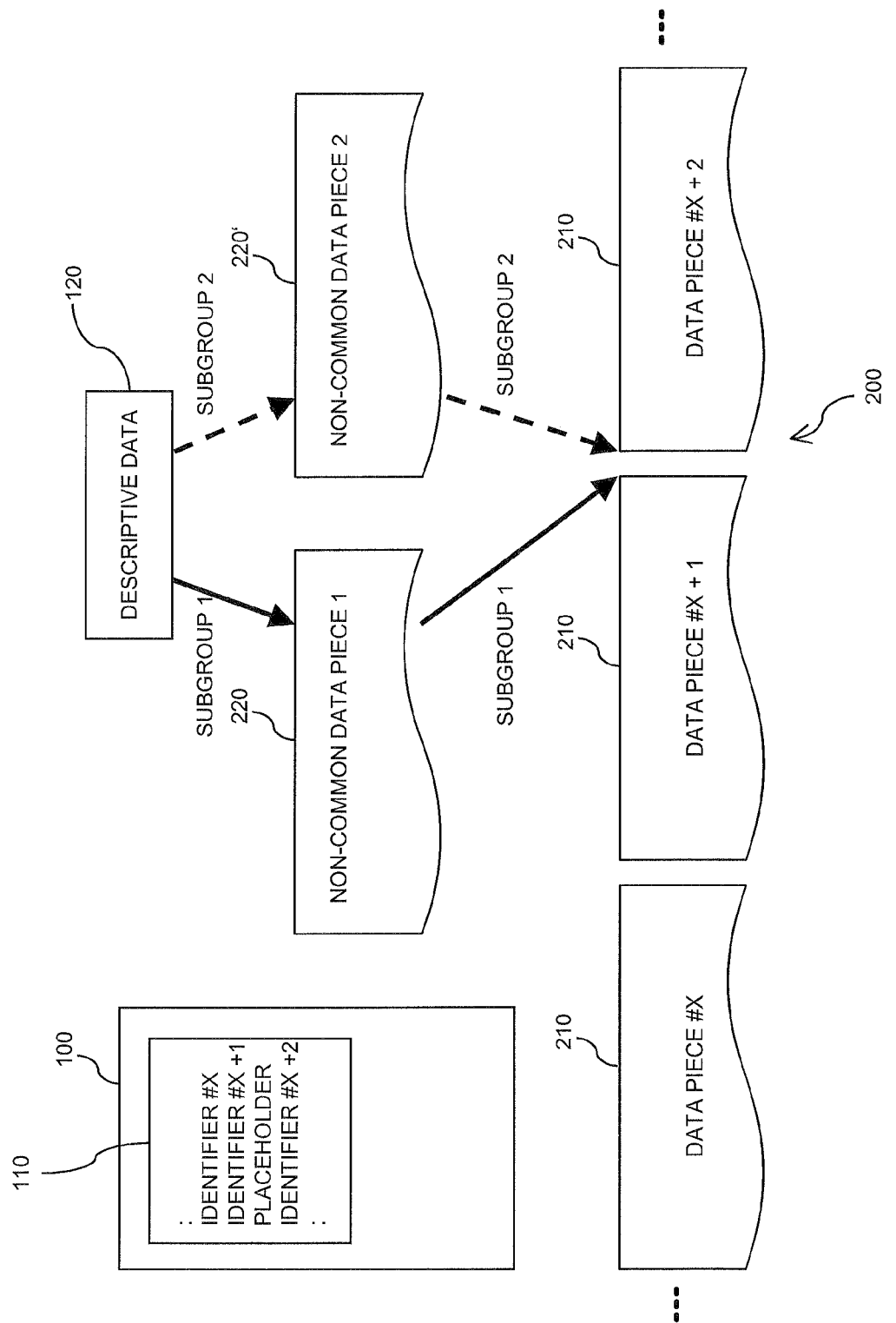
FIG. 1 schematically illustrates the structure of a data entity, which is provided with an non-common data piece, and a descriptive file of the data entity as used according to an embodiment of the invention.

FIG. 1 schematically illustrates the structure of a data entity 200 which is individualized by including one or more non-common data pieces 210. Further, FIG. 1 also schematically illustrates the structure of a descriptive file 100 as used in an embodiment of the invention.

As illustrated, the data entity 200 is subdivided into a plurality of data pieces 210. The data pieces 210 may be joined together in a given order so as to form the data entity 200. For example, if the data entity 200 includes multimedia content, e.g. audio data and/or video data, then the data pieces 210 may be arranged in the order in which the multimedia content is intended to be played out. According to an embodiment, the data pieces 210 may be pieces of a media file, or may be individual media files. In FIG. 1, the ordering of the data pieces 210 is indicated by numbers #X, #X+1, #X+2. In accordance with this given order, the data pieces 210 will be joined together to form the data entity 200 by placing the data piece 210 with the number #X+1 after the data piece 210 with the number #X, and by placing the data piece 210 segment with the number #X+2 after the data piece 210 with the number #X-+1.

As further illustrated in FIG. 1, the data entity 200 is individualized by providing an non-common data piece 220, which is to be included in the data entity 200 as received by different subgroups of peers. A first type of the non-common data piece 220 is provided for a first subgroup of peers (subgroup 1), and a second type of the non-common data piece 220 is provided for a second subgroup of peers (subgroup 2). The first and second types of the non-common data piece 220 have different content. The other data pieces 210 are common to all peers of the group and are therefore also referred to as common data pieces. Accordingly, the data entity 200 which is received by the first subgroup and the second subgroup may be individualized by including a respective type of the non-common data piece 220. In this respect, it is to be understood that it is also possible to provide more than two different types of the non-common data piece 220 so as to obtain individualization with respect to more than two subgroups. Further, the data entity 200 may include more than one individualized data piece. Also, it is to be understood that the non-common data piece 220 may be inserted between the common data pieces 210 of the data entity 200 at a given position or may replace a given one of the common data pieces 210.

The descriptive file 100 is provided for the purpose of allowing the client to control the reception of the data entity 200. For this purpose, the descriptive file 100 includes an identifier section 110. The identifier section 110 includes a corresponding identifier for each of the common data pieces 210 of the data entity 200. In the illustrated example, the identifier with number #X corresponds to the data piece 210 with the number #X, the identifier with the number #X+1 corresponds to the data piece 210 with the number #X+1, and the identifier with the number #X+2 corresponds to the data piece 210 with the number #X+2. These identifiers may be used to directly identify the common data pieces 210. In other words, there is a one-to-one relation between the data pieces 210 and their corresponding identifiers. These identifiers may therefore also be referred to as identifiers of a direct type.

As further illustrated, the identifier section 110 of the descriptive file 100 includes a further identifier (designated with "PLACEHOLDER") which is of a placeholder type. The identifier of the placeholder type is associated with descriptive data 120 of the non-common data piece 220. The descriptive data 120 may be of a first type or of a second type. The first type of the descriptive data 120 corresponds to the first subgroup and refers to the first type of the non-common data piece 220 provided for the first subgroup. The second type of the descriptive data 120 corresponds to the second subgroup and refers to the second type of the non-common data piece 220. Again, it is to be understood that for obtaining individualization with respect to further subgroups of peers, further types of the descriptive data 120 may be provided. As compared to the identifiers of the direct type, which have a one-to-one relation to the common data pieces 210, the identifier of the placeholder type refers to the descriptive data 120, which may be of different types. Accordingly, the identifier of the placeholder type allows for identifying different types of the non-common data piece 220 depending on the specific subgroups of peers which is intended to receive the data entity 200. However, the identifier section 110 of the descriptive file 100 is left unchanged by this individualization.

According to an embodiment, the identifiers of the direct type may be signatures of the corresponding data pieces 210, e.g. hash values. For example, if the data communication is based on the BitTorrent protocol, the descriptive file 100 may be a torrent file according to the BitTorrent protocol, and the identifier section 110 may be the "info" section of the torrent file. In this scenario, the identifiers of the direct type may each be a hash value of the corresponding data piece 210, e.g. hash values computed according to the Secure Hash Algorithm 1 (SHA1).

The identifier of the placeholder type may be associated with the descriptive data 120 by storing the descriptive data 120 at a predefined location. For example, the descriptive data 120 may be stored at a predefined location within the descriptive file 100, but outside the identifier section 110. According to other examples, other predefined locations may be used, e.g. an additional file, a predefined network location, e.g. identified by a Uniform Resource Locator, a predefined memory location within the recipient device, or the like.

The identifier of the placeholder type may have the same format as the identifiers of the direct type. For example, if the identifiers of the direct type are hash values of a given length, e.g. 20 byte, then the identifier of the placeholder type may be a value of the same length. According to an example, the identifier of the placeholder type may be computed as a dummy signature, e.g. the SHA1 hash value of the phrase "ericsson ads P2P solution" which is [4d622cad7ba532e8defe3d60e2bf75a2e2f369c]. The descriptive data 120 associated with the identifier of the placeholder type may in turn include an identifier of the direct type having a one-to-one relation to the specific type of the non-common data piece 220 which corresponds to the subgroup intended to receive the individualized data entity 200. According to an embodiment, the descriptive data 120 may include the signature of the specific type of the non-common data piece 220, e.g. the SHA1 hash value. The descriptive data 120 may also provide supplemental information about the specific type of the individualized data piece 220, e.g. the size of the specific type of the individualized data piece 220. According to an embodiment, including the size in the descriptive data 120 may be used to provide support of arbitrary sizes of data pieces in a protocol using otherwise uniform sizes of the data pieces 210, e.g. in the BitTorrent protocol.

According to the concepts as explained above, a solution is provided for the problem of uniquely identifying a content item, i.e. the data entity 200, regardless of any added individual parts, e.g. the non-common data piece 220. This is achieved by using a descriptive file, e.g. the descriptive file 100, which includes the identifiers of the direct type, which have a one-to-one relation to the data pieces 210 of the data entity 200, and at least one identifier of the placeholder type, which may be included in the descriptive file 100 at a position corresponding to the individualized content. In a P2P scenario on the basis of the BitTorrent protocol, the identifiers of the direct type will be hashes of the data pieces 210 of the main content, i.e. of the data entity 200, and the identifiers of the placeholder type are provided where the individualized parts are supposed to be. Accordingly, the part of the descriptive file which includes the identifiers of the direct type and the identifier or identifiers of the placeholder type will have the same signature. The descriptive file, which may be a torrent file according to the BitTorrent protocol, which has been individualized in the above-mentioned manner, i.e. by introducing at least one identifier of the placeholder type, is then provided to the peers which are intended to receive the data entity 200. The peer can then fetch the common data pieces 210 from all peers of the group, and can fetch non-common data piece 220 from the peers belonging to the subgroup sharing the same specific type of the non-common data piece 220. For example, in a scenario in which the main content is multimedia content and the at least one non-common data piece 220 corresponds to one or more advertisements, information with respect to the specific type of the at least one non-common data piece 220 may be included in the descriptive data 120, which may be placed in the descriptive file 100, e.g. in the torrent file according to the BitTorrent protocol. Accordingly, the user can fetch only those advertisements which are described in the descriptive file 100.

According to some embodiments, it is also possible that the identifier of the placeholder type is used at different positions in the descriptive file 100 as a reference to different non-common data pieces 220. The specific type of the non-common data piece 220 to be fetched can then be dependent on the position of the identifier of the placeholder type in the descriptive file 100. Further, the identifier of the placeholder type may in some cases be used as a reference to one or more of the data pieces 210 of the data entity, i.e. of main content, rather than using the identifier of the direct type to refer to this data piece 210. This data piece 210 may be randomly selected. In a scenario in which the main content is multimedia content, which is individualized by one or more advertisements, occasional usage of the identifier of the placeholder type as reference to a piece of the main content may be used to avoid facilitating skipping of the advertisements.

In the above description, the concepts have been explained as being applicable, e.g., to data communication according to the BitTorrent protocol. However, it is to be understood that the concepts may be applied to other types of P2P protocols as well. Advertisements to be integrated into a main multimedia content are only one example of a data entity which is communicated to different subgroups of the peers in an individualized manner. Another examples is distribution of software in slightly differing versions, e.g. with respect to language modules or system architecture specific modules such as 32 bit modules and 64 bit modules.

Figure 2:
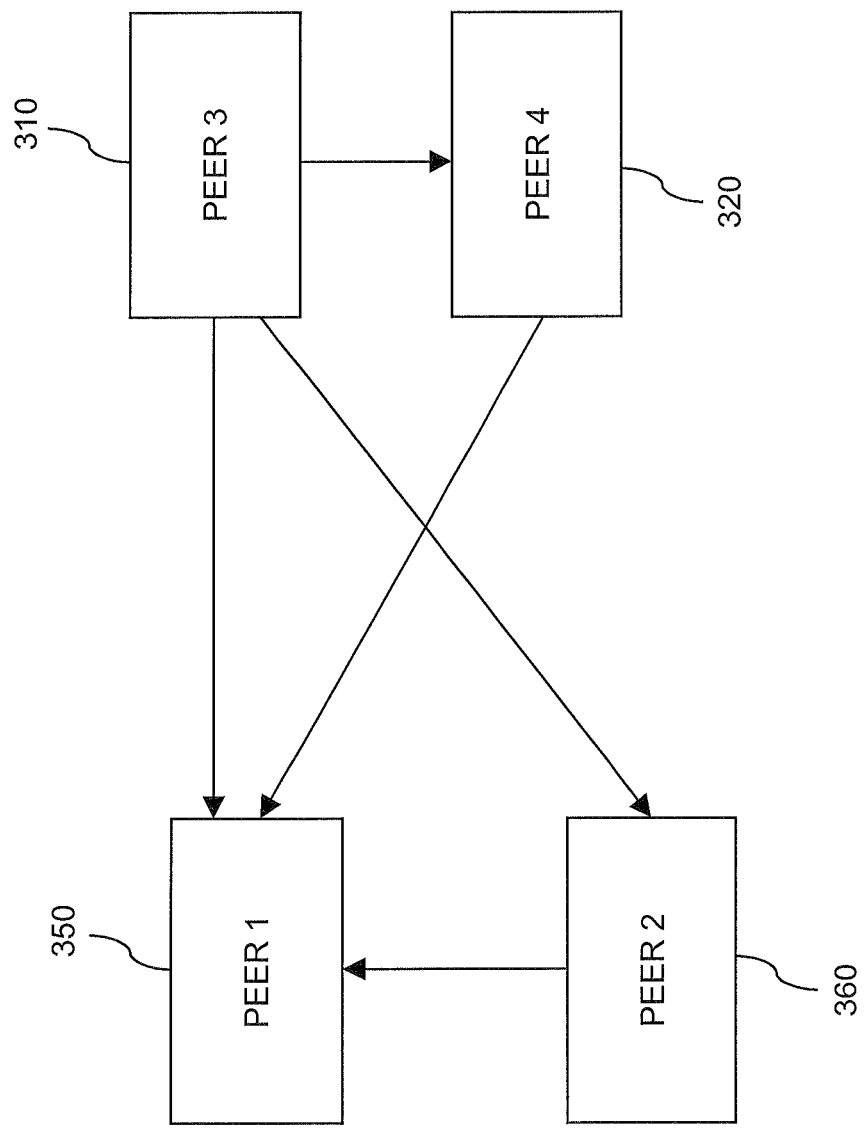
FIG. 2 schematically illustrates a peer-to-peer network environment in which concepts according to embodiments of the present invention may be applied.

FIG. 2 schematically illustrates a P2P network environment in which the above concepts may be applied. More specifically, FIG. 2 focuses on the above-mentioned aspect that the common and non-common data pieces 210, 220 may be retrieved from different peers. As mentioned above, the common data pieces 210 may be retrieved from all peers of the group. As compared to that, retrieving the at least one non-common data piece 220 is possible only from a subgroup of the group of peers.

In the network environment of FIG. 2, a number of peers 310, 320, 350, 360 are illustrated. The illustrated peers 310, 320, 350, 360 may correspond to end-recipient devices, but may also be other types of devices, such as content aggregating servers. For example, the devices 310 and 320 may be servers storing the common data pieces 210 and/or the non-common data pieces 220, and the devices 350 and 360 may be any type of end-recipient devices, e.g. user terminals, computer systems intended to receive a specific software, or the like.

From the perspective of the peer 350, there exist different possibilities of obtaining one of the common data pieces 210. For example, the common data piece 210 may be retrieved from the peer 310. In addition, the same common data piece 210 may have been provided from the peer 310 to the peer 320, e.g. in the course of P2P data communication, and the peer 350 may obtain this common data piece 210 from the peer 320 as well. Further, the common data piece 210 may have been provided from the peer 310 to the peer 360, e.g. in the course of P2P data communication, and the peer 350 may obtain this common data piece 210 also from the peer 360. Accordingly, the peer 350 is provided with different options for obtaining the common data piece 210. Selection between these different options may be carried out, e.g., on the basis of properties of a data connection to the peer 310, 320, 360, e.g. on the basis of a latency and/or a bit rate of the data connection. In this way, the common data piece 210 may be obtained from the most suitable location and network resources may be used in a very efficient manner. For obtaining the non-common data piece 220, the situation is similar. However, if the peers 350 and 360 belong to different subgroups which are intended to receive different individualized versions of the data entity 200, the peer 350 will not be able to obtain the non-common data piece 220 from the peer 360.

FIGS. 3A and 3B show examples of descriptive files which may be used in data communication according to the Bit Torrent protocol, i.e. examples of torrent files.

According to the BitTorrent protocol, there are two main levels where the integrity of the transmitted content is checked.

The first one is dedicated to the integrity of the descriptive file. It includes verifying the main part of the descriptive file, which contains, among other details, the regular length of a data piece, the hashes of the pieces, their number, the size(s) of the file(s) to rebuild, their name(s) and directory structure, or the like.

Whereas the main part of the descriptive file includes information about what is to be received, other parts of the descriptive file may include information how it is to be received or downloaded, e.g. by providing one or more tracker URLs, tracker protocols, information on who created the descriptive file, when it was generated, a human-readable comment of an author, or the like.

According to the BitTorrent protocol, the footprint, i.e. SHA1 hash value, of the main part of the descriptive file constitutes the signature of the descriptive file. This signature is used for verifying the integrity of the descriptive file.

A further integrity check happens when a data piece is acquired: a SHA1 hash value of the received data piece is computed and compared to the one which was supposed to be received according to the main part of the descriptive file.

The above-described concepts of individualization allow for leaving the main part of the descriptive file 100 unchanged, while still being able to communicate individualized content to different subgroups of peers.

It should be noted that the following description relating to an implementation of the concepts on the basis of the BitTorrent protocol are based on the single file mode of the BitTorrent protocol. However, it is to be understood that the concepts may be applied to the multi-file mode of the BitTorrent protocol as well.

In FIGS. 3A and 3B, the main part of a torrent file is schematically illustrated. The main part is located in the info section of the route dictionary and includes fields designated as "length", "name", "piece length", and "pieces". The field "length" defines the length of the file to be communicated in bytes. The field "name" defines the suggested name of the file. The field "piece length" defines the piece length in bytes. The field "pieces" includes a string consisting of a concatenation of 20-byte SHA1 hash values. One hash value is provided for each piece of the file. The field "pieces" therefore includes a byte string.

The example of FIGS. 3A and 3B assumes that the file has a length of "XXXXX", e.g. 11264 bytes, that the name of the file is "YYYYY", and that the piece length is "ZZZZ", e.g. 1024. Further, it is assumed that there are ten common data pieces of main content, designated P1, P2, ..., P10, which have corresponding hash values SHA1(P1), SHA1(P2), ..., SHA1(P10). Further, the descriptive files of FIGS. 3A and 3B include, in the field "pieces" a hash value SHA1(B) or SHA1(G) associated with an non-common data piece B or G, respectively. For example, if the file corresponds to a movie, this non-common data piece may correspond to an advertisement. For the sake of clarity, it is assumed that the advertisement is provided in one piece. However, an advertisement could also be provided in two or more pieces. The hash value of the non-common data piece is inserted between the other hash values. Further, the example of FIGS. 3A and 3B assumes that the non-common data piece, e.g. advertisement, is different for each targeted group. For example, the non-common data piece B may be targeted to young boys, and the non-common data piece G may be targeted to young girls. Accordingly, the descriptive file as illustrated in FIG. 3A would pertain to the targeted group of young boys, whereas the descriptive file of FIG. 3B would pertain to the targeted group of young girls.

As explained above, according to the BitTorrent Protocol, the entries in the main part of the descriptive file, i.e. in the section of "info" forms the basis of the signature of the descriptive file, also referred to as "infohash". Accordingly, the signature depends only on the fields as illustrated in FIGS. 3A and 3B.

However, as can be seen from FIGS. 3A and 3B, the infohash will be different for the two descriptive files of FIGS. 3A and 3B. Accordingly, in the BitTorrent protocol, these descriptive files will be seen as referring to completely different content. No peer offering the "boys' version" of the movie could contribute to the "girls' version".

FIG. 4 shows an example of a descriptive file which, in accordance with concepts as explained herein, allows for individualizing the content without generating different infohashes. As can be seen, the section "info" is generally similar to that of the descriptive files of 3A and 3B. However, in the field "pieces", there is no hash value of the individualized data piece, i.e. of the piece "B" or of the piece "G", but only a placeholder, designated as PH. Accordingly, the part of the descriptive file which varies between FIGS. 3A and 3B, which may also be referred to as dynamic part, is replaced by the placeholder which may act as a symbolic link common to all targeted subgroups.

The placeholder PH, which is one example of the above-mentioned identifier of the placeholder type, has the same length as the other piece signatures, e.g. 20 bytes according to the BitTorrent protocol. The placeholder PH may be settled once, e.g. defined in a standard. For example, a potential placeholder could be the SHA1 hash value of "ericsson ads 2P2 solution" which is [4d622cad7ba532e8defe3d60e2bf75a2e2f369c]. Typically, the placeholder PH would be determined in such way that confusion with the signatures of the pieces is avoided. Since the placeholder PH is not a hash value computed from a specific data content, it may also be referred to as a fake signature or dummy signature. According to some embodiments, a mechanism may be provided according to which the placeholder PH needs to be requested from a remote entity, e.g. from a statistics server. On the basis of the requests to this remote entity, the popularity of the content may be monitored.

Accordingly, when a P2P client wants to fetch a piece on the basis of the placeholder PH, it knows that the placeholder PH should not be used to verify the integrity of the piece, that the piece is not part of the main content and any information about this piece should be checked elsewhere, e.g. on the basis of an extension in the torrent file itself or from a special host or peer, and that the piece is available within a subgroup of the peers and, normally, cannot be fetched from all peers.

Figure 5:
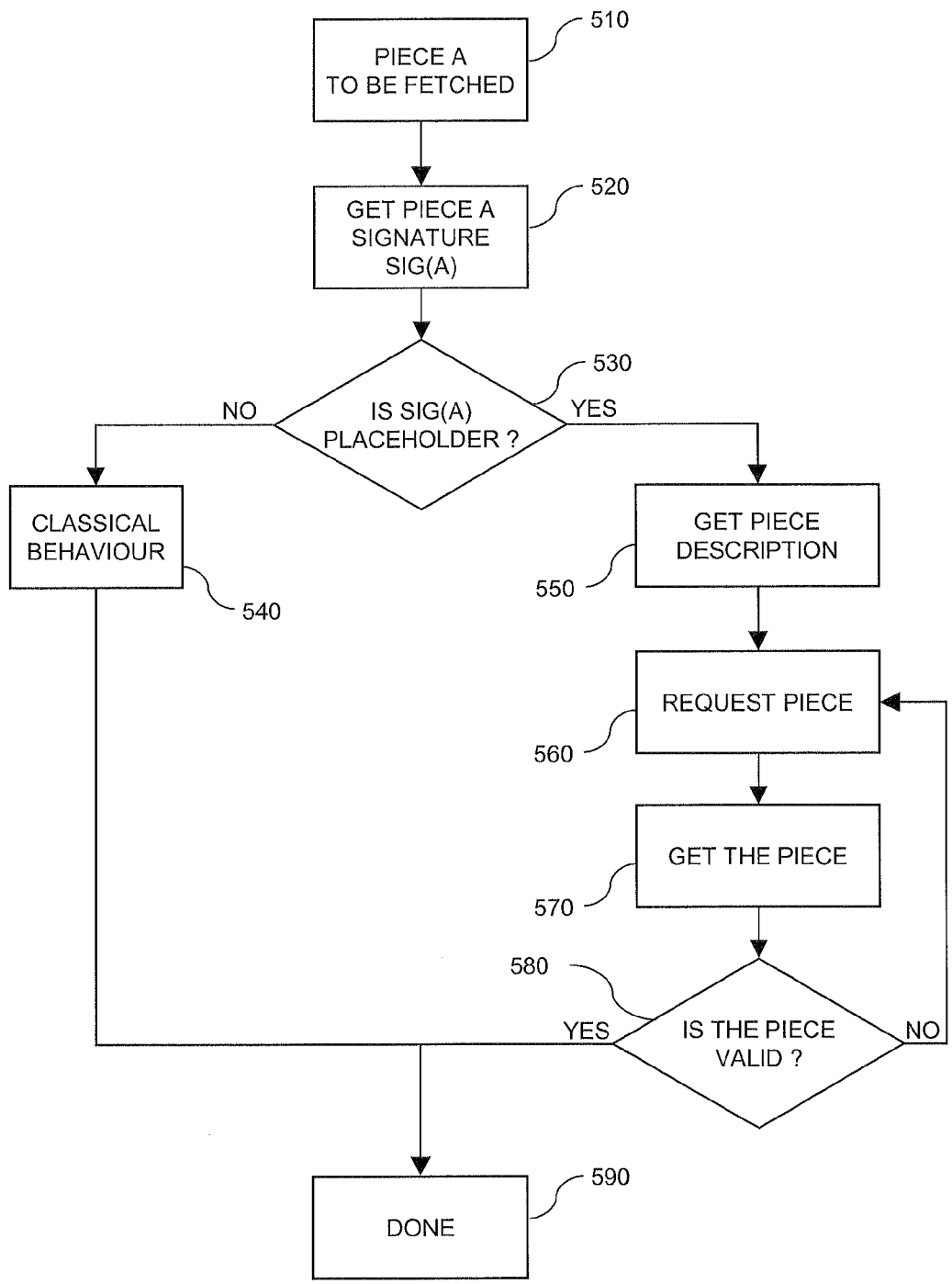
FIG. 5 shows a flow-chart for schematically illustrating a peer-to-peer communication process according to an embodiment of the invention.

An example of a process to be implemented by the P2P client is schematically illustrated by the flow-chart of FIG. 5.

At step 510, the client determines that piece A is to be fetched.

At step 520, the client gets the signature of piece A, designated as SIG(A).

At step 530, it is determined whether the signature of piece A is a placeholder. If this is not the case, the process continues with step 540 in which the piece corresponding to the signature is retrieved in a conventional manner, which corresponds to the classical behaviour according to the BitTorrent protocol.

If, at step 530, it is determined that the signature of piece A is a placeholder, the process continues with step 550. At step 550, the client gets the description, i.e. the descriptive data, of the corresponding non-common data piece. As mentioned above, the descriptive which can be included in the descriptive file, e.g. in any extension outside the main part. In addition, or as an alternative, the description of the dynamic pieces can also be stored in another host and be accessed remotely.

At step 560, the non-common piece is requested and received at step 570. At step 580, it is determined where the non-common data piece is valid, which may be accomplished on the basis of a signature in the piece description obtained at step 550.

The process ends at step 590.

In step 560, it is desirable for the peer requesting the non-common data piece that the peers of the subgroup sharing this non-common data piece are known. In this way, unsuccessful requests to peers not sharing this non-common data piece can be avoided. In the following, techniques will be explained which allow for efficiently providing the needed information to the peer. According to these techniques, non-common data identifiers are used to inform a peer of the group whether another peer belongs to the subgroup sharing the same non-common data piece or not. The non-common data identifiers may be exchanged between the peers of the group, e.g. using a handshake procedure. On the basis of one or more received non-common data identifier, the peer may determine one or more peers of the group sharing the same non-common data piece, and the non-common data piece may be requested from one or more of these peers. In this way, unsuccessful requests to peers of the group not sharing the same non-common data piece may be avoided.

Figure 6:
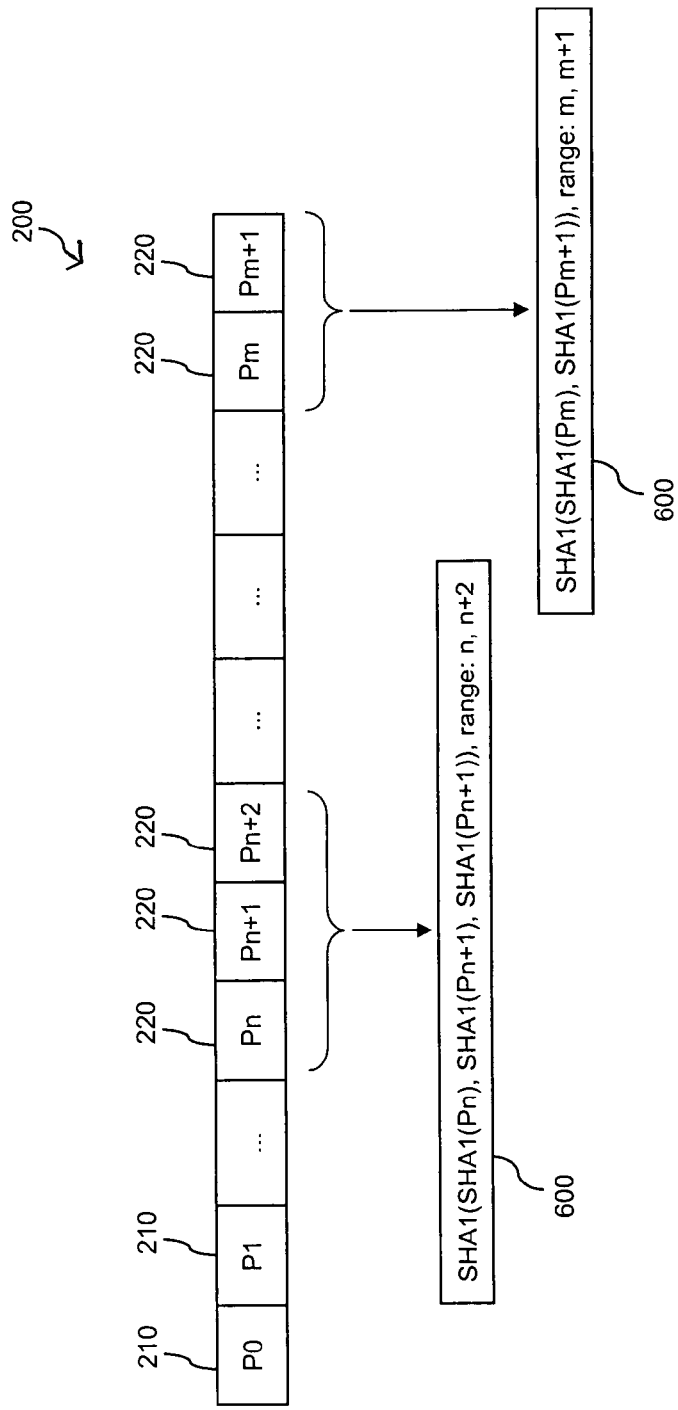
FIG. 6 schematically illustrates an exemplary structure of a data entity which is provided with a number of non-common data pieces and corresponding non-common data identifiers as used in accordance with an embodiment of the invention.

FIG. 6 schematically illustrates an exemplary structure of a data entity 200 which is provided with a number of common data pieces 210 and a number of non-common data pieces 220. Further, FIG. 6 shows non-common data identifiers 600 as used in an embodiment of the invention.

As can be seen, the common data pieces 210 and the non-common data pieces 220 of the data entity 200 are arranged in a given order, which is indicated by a position index of the common and non-common data pieces 210, 220. In the illustrated example, the overall range of the position index is from 0 to m+1, with intermediate position index values of n, n+1, n+2, and m, and the position index values n, n+1, n+2, m, and m+1 belong to non-common data pieces 220. Accordingly, using the placeholder concept as explained in connection with FIGS. 1-5, the identifiers of these non-common data pieces 220 in the descriptive file 100 will be of the placeholder type, e.g. a fake hash value.

In the following, a range of consecutive non-common data pieces 220, i.e. a sequence of non-common data pieces 220 without an intervening common data piece 210 is referred to as a non-common slot. In the example of FIG. 6, a first non-common slot extends from position index n to position index n+2, and a second non-common slot extends from position index m to position index m+1.

In accordance with an embodiment of the invention as illustrated in FIG. 6, the non-common data identifiers 600 are calculated with respect to the non-common slots, i.e. identify a number of the non-common data pieces 220 as included in the non-common slot. Accordingly, the non-common data identifiers 600 of this embodiment may also be referred to as non-common slot identifiers. In some situations, a non-common slot may include empty non-common slot positions, e.g. if the non-common data in this non-common slot is smaller in some individualized version of the data entity 200. In some embodiments, the non-common data identifiers 600 are therefore calculated only on the basis of those non-common slot positions which are not empty. In the example of FIG. 6, a first non-common data identifier 600 identifies the non-common data pieces 220 of the first non-common slot, i.e. the non-common data pieces 220 having a position index in the range from n to n+2, and a second non-common data identifier 600 identifies the non-common data pieces 220 of the second non-common slot, i.e. the non-common data pieces 220 having a position index in the range from m to m+1.

For the purpose of identifying the non-common data pieces 220 of the non-common slot, the non-common data identifiers 600 include a hash value, e.g. a SHA1 hash value. More specifically, the non-common data identifiers 600 include a hash value of individual hash values of the non-common data pieces 220 in the non-common slot. The individual hash values may be SHA1 hash values of the respective non-common data piece. By including the hash value into the non-common data piece, the non-common data pieces 220 may be uniquely identified and be distinguished from non-common data pieces used in other individualized versions of the data entity 200. In other embodiments, other mechanisms may be used to identify the non-common data pieces 220, e.g. other types of hash values or other types of identifiers.

In addition, the non-common data identifiers 600 as illustrated in FIG. 6 include a position indicator to indicate the position of the identified non-common data pieces 220 in the sequence of the common data pieces 210 and the non-common data pieces 220. In the illustrated example, the position indicator specifies the range of the non-common slot by indicating start position index and an end position index of the non-common slot. However, it is to be understood that other ways of indicating the position of the identified non-common data pieces 220 are possible as well, e.g. individually specifying the position index values of the identified non-common data pieces 220 or specifying multiple ranges. Also, in some embodiments the position indicator may be omitted from the non-common data identifier, e.g. if the position of the identified non-common data piece 220 is known in some other way or if the non-common data piece is not necessarily required to be in a specific position.

Further, in some embodiments, a non-common data identifier could be configured to identify only one of the non-common data pieces, e.g. by including a hash value of the non-common data piece, e.g. a SHA1 hash value. In some embodiments it is also possible to use a single non-common data identifier for identifying the non-common data pieces of several or even all non-common slots.

The non-common data identifiers 600 may be computed by each peer on the basis of information in the descriptive data 120 as explained in connection with FIG. 1. As explained above, this information may be included in the descriptive file 100, e.g. in an extension of a torrent file outside the "info" section. In some embodiments, a non-common data identifier could also be computed by another node than one of the peers, e.g. a by a centralized control node aggregating information with respect to the peers of the group, generating one or more non-common data identifiers on the basis of the aggregated information, and providing the generated non-common data identifiers to one or more peers of the group.

Figure 7:
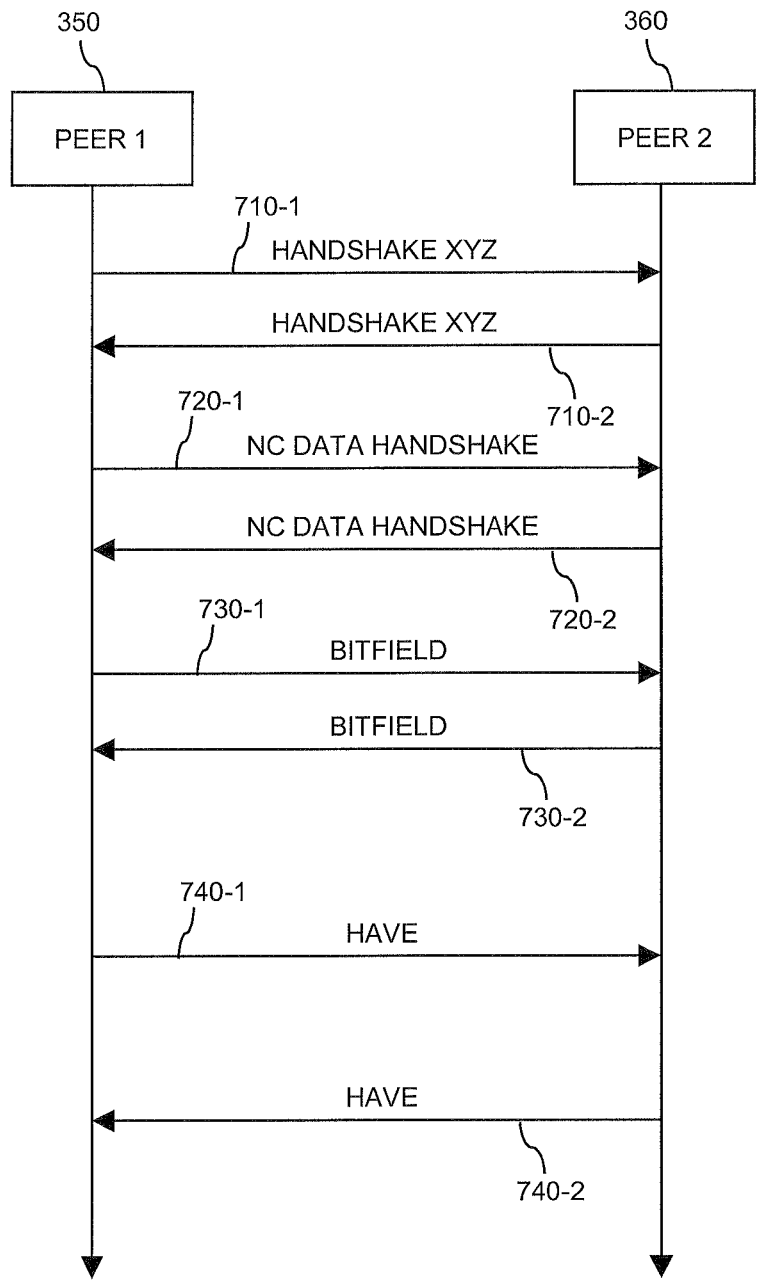
FIG. 7 shows a signalling diagram of a peer-to-peer communication process according to an embodiment of the invention.

FIG. 7 shows a signalling diagram of a P2P communication process according to an embodiment of the invention. The process illustrates signalling communication between a first peer 350 and a second peer 360, e.g. the peers 350 and 360 as illustrated in FIG. 2. It is to be understood that similar signalling will typically take place between all peers of the group. The signalling as illustrated in FIG. 7 has the purpose of providing the peers 350, 360 with the information from which peers of the group they should request one or more non-common data piece 220.

The process starts with the peers 350, 360 exchanging handshake messages 710-1, 710-2. More specifically, if the peer 350 wants to establish P2P communication with the peer 360, it sends a handshake message 710-1 to the peer 360, and the peer 360 responds in a symmetrical manner by sending a handshake message 710-2. If the P2P communication is based on the BitTorrent protocol, the handshake message 710-1, 710-2 includes the infohash which can be used to verify that the peers 350, 360 are working on the same data entity 200.

After exchanging the handshake messages, the peers 350, 360 send non-common (NC) data handshake messages 720-1, 720-2. More specifically, the peer 350 sends a non-common data handshake message 720-1 to the peer 360, and the peer 360 sends a non-common data handshake message 720-2 to the peer 350. The non-common data handshake message 720-1, 720-2 includes at least the non-common data identifier(s) 600 locally generated at the peer 350, 360. In this way the non-common data handshake message 720-1, 720-2 may convey information which allows for uniquely identifying the non-common data pieces 220 shared by the peer 350, 360 sending the non-common data handshake message 720-1, 720-2. In some embodiments, the peer 350, 360 may send a corresponding non-common data handshake message 720-1, 720-2 for each non-common data identifier 600, e.g. for each non-common data piece 220 or for each non-common slot. In other embodiments, multiple non-common data identifiers 600 may be sent in one non-common data handshake message 720-1, 720-2.

On the basis of the non-common data identifier(s) 600 received with the non-common data handshake message 720-1, 720-2, the peer 350, 360 may then determine whether the peer 350, 360 sending the non-common data handshake message 720-1, 720-2 belongs to the subgroup sharing the same non-common data piece(s) 220. For this purpose, the peer 350, 360 may check whether the received non-common data identifier 600 corresponds to its locally generated non-common data identifier 600, e.g. by means of a comparison. For example, when using a hash-value based non-common data identifier 600 as explained in connection with FIG. 6, the peer 350, 360 may check whether the received hash value in the specified range corresponds to the locally generated hash value in the same range. According to some embodiments, the peer 350, 360 may also check whether the received hash value corresponds to the locally generated hash value, which may pertain to the same range or to a different range. Here, it should be noted that the result of this determination may differ from one non-common data piece 220 to the other. In fact, the non-common data handshake message 720-1, 720-2 may include one non-common data identifier 600 identifying non-common data pieces 220 which are shared by the receiving peer 350, 360 and a further non-common data identifier 600 identifying non-common data pieces 220 which are not shared by the receiving peer 350, 360.

Having determined that one or more non-common data pieces 220 are shared by the peer 350, 360 sending the non-common data handshake message 720-1, 720-2, this sharing information may be stored by the peer 350, 360 receiving the non-common data handshake message 720-1, 720-2. For this purpose, a sharing information bitfield may be provided for each other peer of the group. The sharing information bitfield may include a corresponding bit for each of the non-common data pieces 220 of the data entity. A value of this bit may indicate whether the corresponding non-common data piece 220 is shared by the peer to which this sharing information bitfield pertains. For example, a value of "1" may indicate that the corresponding non-common data piece 220 is shared, whereas a value of "0" may indicate that the corresponding non-common data piece 220 is not shared. Initially, all bits in the sharing bitfield provided for a certain peer 350, 360 may be set to "1", e.g. indicate that this peer 350, 360 shares all the non-common data pieces 220 of the data entity. When the non-common data handshake message 720-1, 720-2 is received from this peer 350, 360, those bits in the sharing bitfield may be set to "0" for which it was determined that this peer 350, 360 does not share the corresponding non-common data piece 220. In other embodiments, other ways of storing the sharing information may be provided.

After exchanging the non-common data handshake messages 720-1, 720-2, the peers 350, 360 exchange bitfield messages 730-1, 730-2. More specifically, the peer 350 sends a bitfield message 730-1 to the peer 360, and the peer 360 sends a bitfield message 730-2 to the peer 350. The bitfield message 730-1, 730-2 may include an availability information bitfield to indicate available common and non-common data pieces 210, 220. More specifically, the length of the availability information bitfield may be equal to the number of common and non-common data pieces 210, 220 constituting the data entity 200. For example, if the data entity 200 is subdivided into 38 common and non-common data pieces 210, 220, the length of the availability information bitfield will be 38. The nth bit corresponds to the nth common or non-common data piece 210, 220 in the data entity 200. The availability of a common or non-common data piece 210, 220 may then be indicated by clearing the bit corresponding to a specific common or non-common data piece 210, 220 to indicate that it is not available, and by setting the bit corresponding to a specific common or non-common data piece 210, 220 to indicate that it is available and valid. In some embodiments, the availability information bitfield may be generated by the peer 350, 360 sending the bitfield message 730-1, 730-2 taking into account the sharing information with respect to the non-common data pieces 220. In particular, the availability information bitfield may be generated to indicate that a specific non-common data piece 220 is available at the peer 350, 360 if the other peer 350, 360 receiving the bitfield message 350, 360 was determined to belong to the subgroup sharing this non-common data piece 220. Otherwise, the availability information bitfield may be generated to indicate that this non-common data piece 220 is not available. The availability information bitfield received with the bitfield message 730-1, 730-2 may be stored by the peer 350, 360 receiving the bitfield message 730-1, 730-2. In this way, each peer 350, 360 may keep availability information of the common and non-common data pieces 210, 220 by storing a corresponding availability information bitfield for each of the other peers of the group. In some embodiments, the availability information bitfield may be stored by the peer 350, 360 receiving the bitfield message 730-1, 730-2 taking into account the sharing information with respect to the non-common data pieces 220. In particular, the availability information bitfield may be stored to indicate that a specific non-common data piece 220 is available at the other peer 350, 360 sending the bitfield message 730-1, 730-2 if this peer 350, 360 was determined to belong to the subgroup sharing this non-common data piece 220. Otherwise, the availability information bitfield may be stored to indicate that this non-common data piece 220 is not available at the other peer 350, 360.

According to some embodiments, the sharing information bitfield has the same length as the bitfield of the bitfield message 730-1, 730-2, and in the sharing information bitfield the bit positions corresponding to the non-common data pieces 220 may be the same as in the bitfield of the bitfield message 730-1, 730-2. The bitfield of the bitfield message to be transmitted in the bitfield message 730-1, 730-2 or to be stored may then be generated by subjecting the sharing information bitfield and the bitfield of the bitfield message 730-1, 730-2 to a logical AND operation. In this way, the bitfield of the bitfield message 730-1, 730-2 will only indicate that a non-common data piece 220 is available at a peer if this peer was determined to belong to the subgroup sharing this non-common data piece 220.

Later, if a previously not available common or non-common data piece 210, 220 becomes available at one of the peers 350, 360, e.g. due to being received from some other peer of the group, the peer 350 sends a have message 740-1, 740-2 indicating that this common or non-common data piece 210, 220 is now available. The have message 740-1, 740-2 may include position index of the common or non-common data piece 210, 220. In some embodiments, the peer 350, 360 sends the have message 740-1, 740-2 with respect to a newly available non-common data piece 220 only if the other peer 350, 360 was determined to belong to the subgroup sharing this non-common data piece 220. The peer 350, 360 receiving the have message 740-1, 740-2 with respect to a non-common data piece 220 may check whether this non-common data piece 220 is shared with the peer 350, 360 sending the have message 740-1, 740-2, e.g. on the basis of the stored sharing information. If so, the stored availability information bitfield of the peer 350, 360 sending the have message 740-1, 740-2 is updated accordingly and the non-common data piece 220 may be retrieved from the peer 350, 360 using the process as explained in connection with FIG. 5. According to some embodiments, the peer 350, 360 may send the have message 740-1, 740-2 only to the other peer 350, 360 if the other peer 350, 360 was determined to belong to the subgroup sharing the newly received non-common data piece 220. According to such embodiments, it is not necessary for the peer 350, 360 receiving the have message 740-1, 740-2 to check whether the non-common the non-common data piece 220 is shared with the peer sending the have message 740-1, 740-2.

Accordingly, different types of availability indicator may be exchanged by the peers 350, 360, e.g. the availability information bitfield or the have message.

Figure 8:
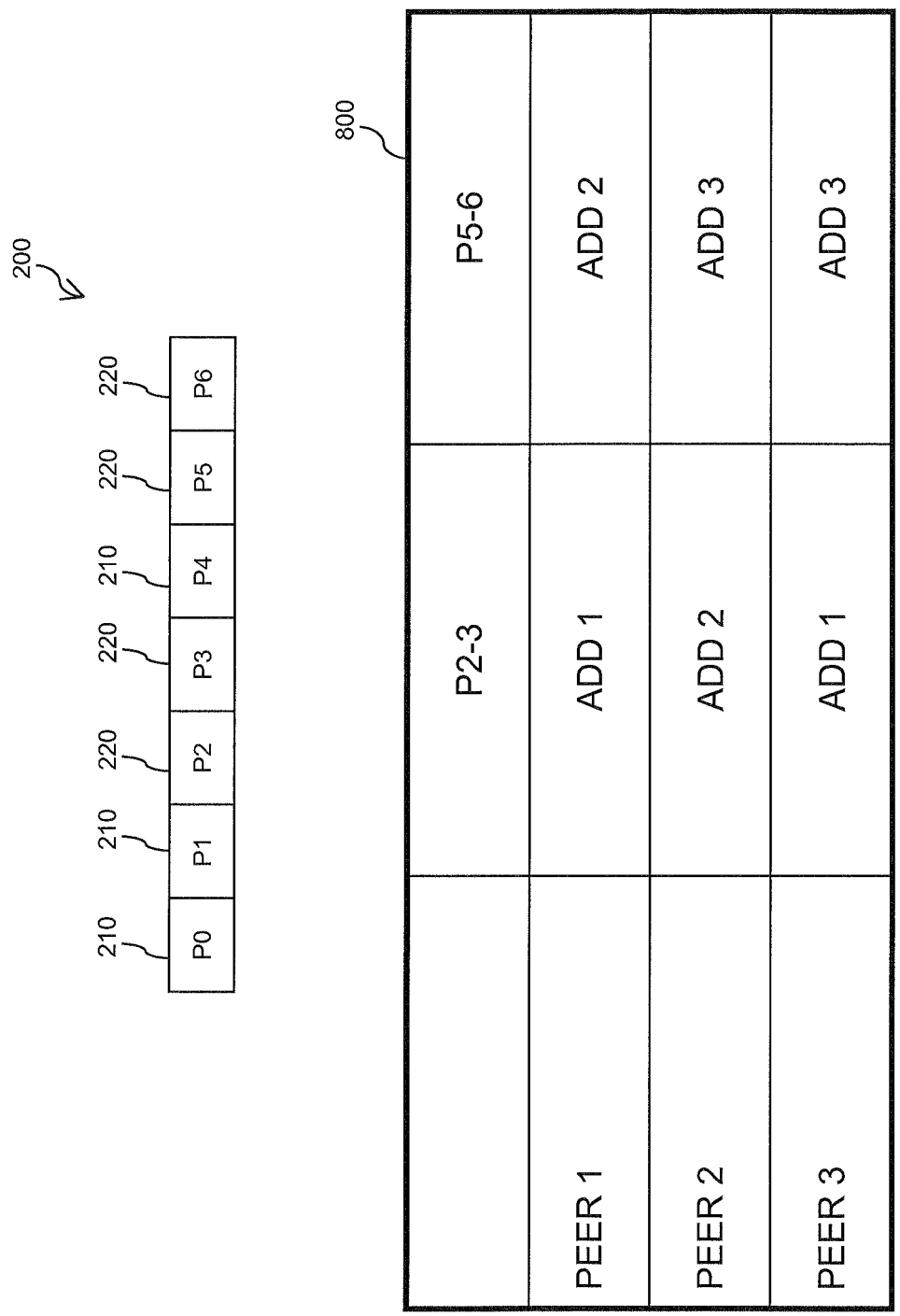
FIG. 8 illustrates an exemplary scenario of peer-to-peer communication according to an embodiment of the invention.

FIG. 8 illustrates an exemplary scenario of P2P communication according to an embodiment of the invention. In this scenario, it is assumed that the data entity 200 is distributed to three peers, i.e. a first peer (peer 1), a second peer (peer 2), and a third peer (peer 3) using individualized P2P communication according to the concepts as explained herein. In this scenario, the data entity 200 is assumed to be multimedia content, e.g. a video, which is individualized by including three different types of advertisements, i.e. a first advertisement (add 1), a second advertisement (add 2), and a third advertisement (add 3). As illustrated, the data entity 200 includes a total of seven data pieces, three common data pieces 210 and four non-common data pieces 220. The common data pieces 210 have index values 0, 1, and 4, and the non-common data pieces 220 have index values 2, 3, 5, and 6. Accordingly, there are two non-common slots, a first non-common slot ranging from index value 2 to 3 and a second non-common slot ranging from index value 5 to 6.

As illustrated by table 800 of FIG. 8, it is intended that the first peer receives the first advertisement in the non-common slot of index values 2-3 and the second advertisement in the non-common slot of index values 5-6, that the second peer receives the second advertisement in the non-common slot of index values 2-3 and the third advertisement in the non-common slot of index values 5-6, and that the third peer receives first advertisement in the non-common slot of index values 2-3 and the third advertisement in the non-common slot of index values 5-6.

It is assumed that the second peer has already received all the pieces when the third peer starts to receive the data entity and that the first peer has is still missing the non-common data piece 220 having index value 6 (P6).

The third peer now fetches the descriptive data 120 of the non-common data pieces 220, i.e. from an extension of the descriptive file 100 provided to the third peer. When using a BitTorrent protocol, the descriptive data 120 of the non-common data pieces 220 may include the individual hash codes (e.g. SHA1 hash values) of the non-common data pieces 220. The descriptive data is then used to locally calculate the non-common data identifiers 600 for the non-common slot of index values 2-3 and for the non-common slot of index values 5-6. As explained above, this may involve calculating a hash value of the individual hash values corresponding to the non-common slot. For example the non-common data identifier 600 of advertisement 1 in the non-common slot of index values 2-3 may be calculated according as SHA1(SHA1(P2) SHA1(P3)). The non-common data identifier 600 of advertisement 3 in the non-common slot of index values 2-3 may be calculated according as SHA1(SHA1(P5)SHA1(P6)).

The third peer then continues by exchanging the non-common data handshake messages with the first peer and with the second peer. As a result, the third peer will receive the non-common data identifiers 600 from the first peer and from the second peer. Initially the sharing information bitfields as provided by the third peer for the first peer and for the second peer are set to "111111" (one bit for each data piece of the data entity).

On the basis of the non-common data handshake message received from the first peer, the third peer determines that the first peer does not share the same non-common data pieces 220 in the non-common slot of index values 5-6. In particular, the non-common data identifier received for this non-common slot is different from the locally generated one. Accordingly, the sharing information bitfield corresponding to the first peer is set to "111100". On the basis of the non-common data handshake message received from the second peer, the third peer determines that the second peer does not share the same non-common data pieces 220 in the non-common slot of index values 2-3. In particular, the non-common data identifier received for this non-common slot is different from the locally generated one. Accordingly, the sharing information bitfield corresponding to the second peer is set to "110011".

Then the third peer receives the bitfield messages from the first peer and from the second peer. The availability information bitfield received in the bitfield message from the first peer indicates that all common and non-common data pieces 210, 220 except the non-common data piece 220 having index value 6 (P6) are available at the first peer, i.e. is "111110". The availability information bitfield received in the bitfield message from the second peer indicates that all common and non-common data pieces 210, 220 are available at the second peer, i.e. is "111111". The sharing information bitfield of the first peer ("111100") is applied as an AND mask to the received availability information bitfield of the first peer ("111110"), resulting in "111100". The sharing information bitfield of the first peer ("111100") is applied as an AND mask to the received availability information bitfield of the first peer ("111110"), resulting in "110011".

The third peer may then fetch the common and non-common data pieces 210, 220 from the peers according to the masked availability information bitfields. This means that the third peer will not attempt to fetch the non-common data pieces 220 of the non-common data slot of index values 2-3 from the second peer, and will not attempt to fetch the non-common data pieces 220 of the non-common data slot of index values 5-6 from the first peer.

When the first peer receives the non-common data piece 220 having index value 6 (P6), the first peer sends the have message to the third peer thereby indicating that this non-common data piece is now available at the first peer. The third peer received this message. However, before updating the availability information bitfield corresponding to the first peer, the third peer checks the sharing information bitfield of the first peer, which says, by having the corresponding bit set to "0", that the non-common data piece 220 having index value 6 (P6) is not shared by the first peer. Accordingly the third peer will not update the availability information bitfield of the first peer. Accordingly, even after receiving the have message with respect to the non-common data piece 220 having index value 6 (P6), the third peer will not attempt to fetch this non-common data piece 220 from the first peer.

In the above example, it should be noted that in some embodiments the first peer and the second peer may exchange the non-common data pieces 220 of the second advertisement, irrespective of these advertisements being located in different non-common slots. For example, the first peer may obtain the second advertisement from the second peer, even though the non-common data pieces 220 are not in the same non-common slot. For this purpose, a peer may look if he has the non-common data piece identified with an SHA in any of his non-common slots and store this sharing information or transmit this sharing information to other peers, e.g. using the availability bitmap field. In the illustrated example, the second peer may set, when receiving the non-common data identifier from the first peer, the bits of the availability indicator for the non-common slot positions of the non-common data pieces having index values 5 and 6, since these non-common data pieces are shared with the first peer and available at the second peer. Prerequisite is of course that the received non-common data identifier matches the locally non-common data identifier, e.g. that received SHA1(P5) is identical with locally generated SHA1(P2) and that received SHA1(P6) is and identical with locally generated SHA1(P3). The availability bitmap may then be communicated to the first peer.

Figure 9:
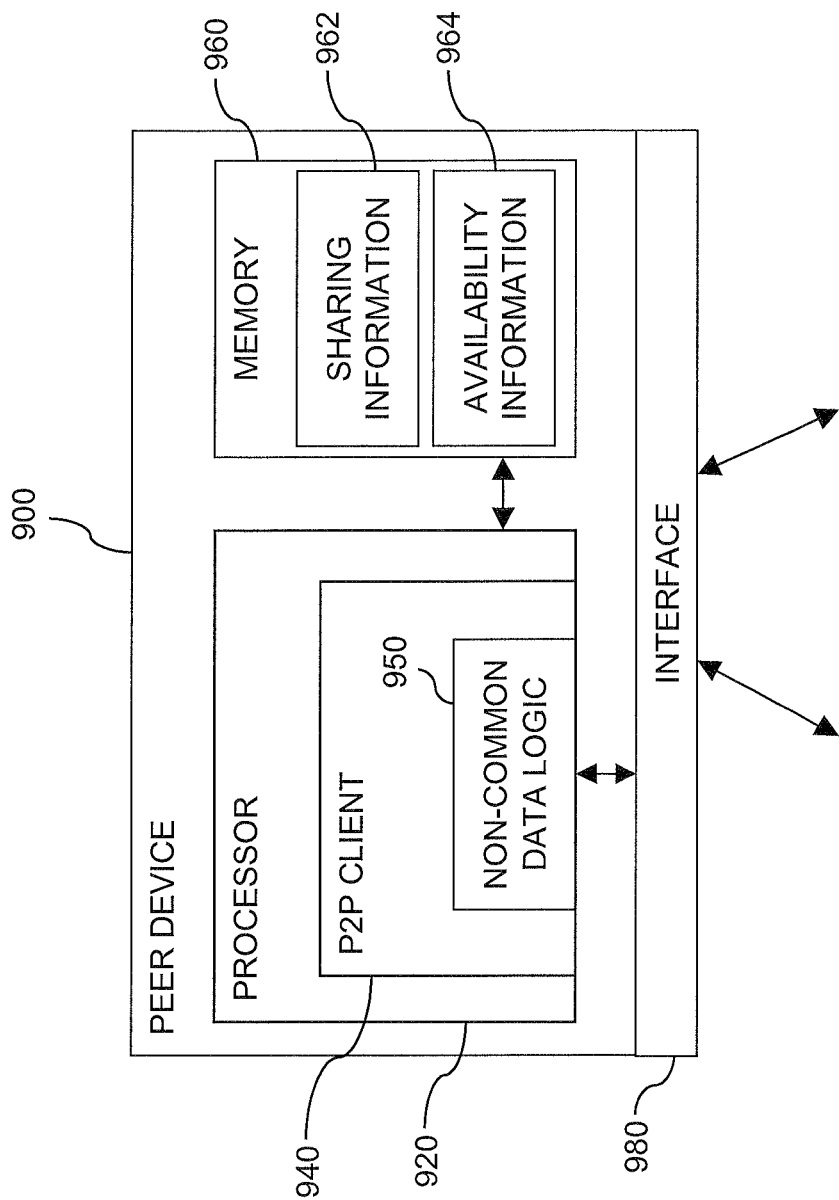
FIG. 9 schematically illustrates a peer device according to an embodiment of the invention.

FIG. 9 schematically illustrates the structure of a peer device 900 according to an embodiment of the invention. For example, the peer device 900 may implement one of the peers 310, 320, 350 or 360 in FIG. 2. For the sake of clarity, the peer device 900 is illustrated with components which are considered to be helpful for understanding the concepts as described herein. However, it is to be understood that the peer device 900 may comprise further components as well, depending on the specific implementation of the peer device 900.

As illustrated, the peer device 900 includes a processor 920 which implements a P2P client 940 with a non-common data logic 950. The P2P client 940 and the placeholder logic 950 may be implemented by suitably designed program code which is executed by the processor 920. The peer device 900 further includes a memory 960 which is coupled to the processor 920, to the P2P client 940 and to the non-common data logic 950, and an interface 980 which is coupled to the processor 920, to the P2P client 940 and to the non-common data logic 950. As illustrated, the memory may store the above-described sharing information 962, e.g. peer-specific sharing information bitfields, and availability information 964, e.g. peer-specific availability information bifields. Using the interface 980, the peer device 900 may communicate with other devices, in particular with other peer devices. Examples of such communication have been outlined in connection with FIG. 2. The interface 980 may be of any type which allows data communication with the other devices. For examples, the interface 980 may be configured to allow data communication according to an internet protocol. Further, it is to be understood that the interface 980 may be based on different physical implementations, e.g. may be configured to use a wired communication channel and/or a wireless communication channel.

The P2P client 940 of the peer device 900 may be configured to accomplish P2P communication functions as explained in connection with FIGS. 1 to 8. In particular, the client 940 may be configured to accomplish reception of data on the basis of the descriptive file. For this purpose, the P2P client 940 is configured to analyze the identifiers in the descriptive file 100. If the identifier is of the direct type, the P2P client 940 may retrieve the corresponding common data piece 210 from another peer on the basis of the identifier of the direct type. The non-common data logic 950 is configured to operate in accordance with the concepts as explained in connection with FIGS. 5 to 8. Specifically, the non-common data logic 950 may determine, with respect to one or more non-common data pieces 220, whether another peer of the group belongs to the subgroup sharing the same non-common data pieces 220 as the peer implemented by the peer device 900. This is accomplished on the basis of one or more of the non-common data identifiers 600 which are received by the peer device 900. The P2P client 940 may then request the non-common data pieces 220 only from those peers which have been determined to belong to the subgroup sharing the same non-common data pieces 220. Further, the non-common data logic 950 may also be configured to locally generate a non-common data identifier 600 identifying one or more non-common data piece 220 shared by the peer device 900. This locally generated non-common data identifier 600 may then be transmitted to other peer devices using the interface 980.

Figure 10:
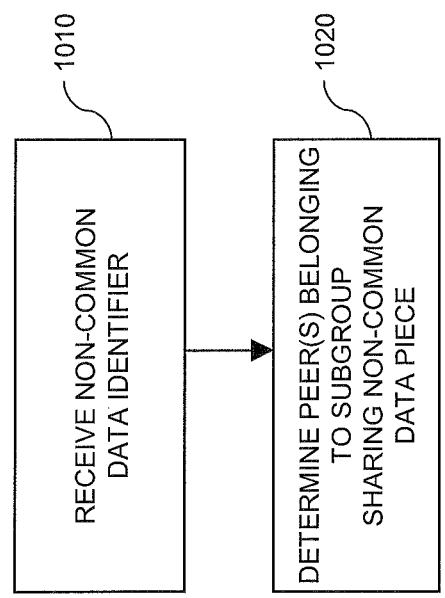
FIG. 10 shows a flow-chart for schematically illustrating a method according to an embodiment of the invention.

FIG. 10 shows a flow-chart for schematically illustrating a method of individualized P2P communication according to an embodiment of the invention. The method may implement the concepts as described above and may be performed in the peer device 900 as described in connection with FIG. 9. In accordance with the concepts as described above, the method has the purpose of communicating a data entity in a group of peers. The data entity includes at least one common data piece and at least one non-common data piece. The data entity may have a structure as explained in connection with FIGS. 1, 7 and 8, i.e. the common data piece may correspond to the above-described common data pieces 210, and the non-common data piece may correspond to the above described non-common data pieces 220.

At step 1010, a non-common data identifier is received. The non-common data identifier may correspond to the above-described non-common data identifier 600. The non-common data identifier may be received, directly or indirectly, from another peer of the group. The non-common data identifier identifies the non-common data piece, i.e. allows for distinguishing the at least one non-common data piece from other types of non-common data pieces which may be shared by some peers of the group. Further, the non-common data identifier is associated with at least one peer of the group, e.g. with the peer from which it was received. The associated peer or peers could also be identified within the non-common data identifier, e.g. by a peer name or peer network address.

At step 1020, it is determined from the received non-common data identifier whether the at least one associated peer belongs to the subgroup sharing the at least one non-common data piece. For this purpose, the received non-common data identifier may be compared to a locally generated non-common data identifier. The having determined that the peer belongs to the subgroup sharing the at least one non-common data piece, the non-common data piece may be retrieved from this peer.

In the above, concepts have been described which allow for individualized P2P communication of a data entity, e.g. by including different advertisements for different people or groups of people into multimedia content or different advertisements at different points of time, without affecting the distribution of the main content, which may be shared by all peers. The individualized portions of the data entity are shared within a subgroup only, the subgroup members being known from the non-common data identifier. For example, the BitTorrent protocol or another P2P protocol may be used to deliver a multimedia file with advertisements in one monolithic block, which makes it harder to temper with this content, e.g. to skip the advertisements, than in a solution in which a playlist points to separate files for the content and advertisement pieces. Further, the concepts provide a possibility to commercialize P2P networks by means of targeted advertising.

It is to be understood that the above explanations are intended to provide a better understanding of the concepts and are susceptible to various modifications. For example, the concepts may be used in connection with different types of P2P communication protocols, in addition to the above-mentioned example of the BitTorrent protocol. Further, the concepts may be applied for various purposes. For example, in addition to distributing multimedia content, the concepts may be applied to distribute software in an individualized manner. The concepts can be used in the distribution of software/files where just few files or portions of the files differ. Here, a good P2P protocol efficiency can be obtained. The concepts can also be used for upgrade purposes. Here, peers with an obsolete overall data version can still share data portions that are still valid.

The identifier of the placeholder type may be used as a general reference to various types of individualized content, and sometimes also as a reference to pieces of the main content. Further, in a BitTorrent scenario, the identifier of the placeholder type may also be used as a reference to a further torrent file.

Also, the concepts may be applied within various types of communication networks, including mobile communication networks, wired communication networks, internet based communication networks, or intranet based communication networks. For example, the concepts can be used within operators domains. Here, the operators will not need to provide different copies of almost the same content. The concepts can also be used to distribute different feeds or different messages to end users through any type of gateway, e.g. a home gateway, a car gateway. Further, various possibilities exist for implementing the functions of the devices and components described herein. For example, these functions may, at the least part, be implemented by software to be executed by processor or by dedicated hardware.

The invention claimed is:

1. A method of communicating a data entity in a group of peers, wherein the data entity comprises at least one common data piece shared by all peers of the group and at least one non-common data piece shared only by a subgroup of the group of peers, wherein the peers of the group attempt to obtain the at least one common data piece or have the at least one common data piece available, and wherein only the peers of the subgroup try to obtain the at least one non-common data piece or have the at least one non-common data piece available, wherein the method comprises:
a first peer of the group receiving a descriptive file of the data entity, the descriptive file comprising:
at least one identifier of a direct type having a one-to-one relation to the at least one common data piece; and
at least one identifier of a placeholder type associated with descriptive data of the at least one non-common data piece;
the first peer of the group receiving a non-common data identifier from a second peer of the group, the non-common data identifier identifying at least one non-common data piece;
the first peer of the group determining, based on the non-common data identifier and the descriptive data, whether the second peer belongs to the subgroup sharing the at least one non-common data piece.

2. The method of claim 1 comprising the first peer, in response to determining that the second peer belongs to the subgroup sharing the non-common data piece, requesting the at least one non-common data piece from the second peer.

3. The method of claim 1 wherein the non-common data identifier comprises a hash value calculated on the basis of the at least one non-common data piece.

4. The method of claim 3 wherein the hash value is a hash value of an individual hash value of the at least one non-common data piece.

5. The method of claim 1 wherein the non-common data identifier comprises a position indicator, the position indicator indicating the position of the at least one non-common data piece in a sequence of the at least one common data piece and the at least one non-common data piece.

6. The method of claim 5 wherein the non-common data identifier identifies a plurality of consecutive non-common data pieces and the position indicator indicates a range of the consecutive non-common data pieces in the sequence.

7. The method of claim 1 further comprising:
the first peer providing, for each other peer of the group, a corresponding sharing information bitfield;
storing sharing information indicating whether one of the peers belongs to the subgroup sharing the non-common data piece in the sharing information bitfield for the corresponding peer.

8. The method of claim 7 wherein the sharing information bitfield comprises a bit corresponding to the at least one non-common data piece, a value of the bit indicating whether the corresponding peer belongs to the subgroup sharing the non-common data piece.

9. The method of claim 1 further comprising:
the first peer providing, for each other peer of the group, a corresponding availability information bitfield;
receiving an availability indicator associated with the at least one of the peers, the availability indicator indicating whether the at least one non-common data piece is available at the corresponding peer;
storing availability information in the availability information bitfield indicating whether the at least one non-common data piece is available at the corresponding peer.

10. The method of claim 9 wherein the availability indicator also indicates whether the at least one common data piece is available at the corresponding peer.

11. The method of claim 9 wherein the storing availability information comprises storing availability information indicating that the non-common data piece is available at one of the peers in response to:
the received availability indicator associated with the corresponding peer indicating that the non-common data piece is available at this peer; and
the received non-common data identifier associated with the corresponding peer indicating that the peer belongs to the subgroup sharing the non-common data piece.

12. The method of claim 1 further comprising:
the first peer, if the non-common data piece is locally available at the first peer, generating a local availability indicator indicating that the non-common data piece is locally available;
the first peer transmitting the local availability indicator to at least one other peer determined to belong to the subgroup sharing the non-common data piece.

13. The method of claim 1 further comprising:
the first peer receiving the at least one common data piece;
the first peer verifying the at least one common data piece based on the associated identifier of the direct type;

the first peer retrieving the descriptive data of the at least one non-common data piece;

the first peer receiving the at least one non-common data piece;

the first peer verifying the non-common data piece based on the retrieved descriptive data.

14. The method of claim 13 further comprising the first peer calculating a local non-common data identifier on the basis of the descriptive data of the at least one non-common data piece.

15. The method of claim 14 further comprising the first peer transmitting the local non-common data identifier to at least one other peer of the group.

16. The method of claim 15 further comprising:

the first peer comparing the local non-common data identifier to the received non-common data identifier.

17. A first peer device of a group of peers, the group of peers communicating a data entity, wherein the data entity comprises at least one common data piece shared by all peers of the group and at least one non-common data piece shared only by a subgroup of the group of peers, wherein the peers of the group attempt to obtain the at least one common data piece or have the at least one common data piece available, and wherein only the peers of the subgroup try to obtain the at least one non-common data piece or have the at least one non-common data piece available, the first peer device comprising:

an interface configured to communicate with other devices of the group of peers;

a processor operatively connected to the interface;

wherein the interface is configured to receive a descriptive file of the data entity, the descriptive file comprising:

at least one identifier of a direct type having a one-to-one relation to the at least one common data piece; and at least one identifier of a placeholder type associated with descriptive data of the at least one non-common data piece;

wherein the interface is further configured to receive a non-common data identifier from a second peer of the group, the non-common data identifier identifying at least one non-common data piece;

wherein the processor is configured to determine, based on the non-common data identifier and the descriptive data, whether the second peer belongs to the subgroup sharing the non-common data piece.

18. The device of claim 17 wherein the processor is further configured to, in response to determining that the second peer belongs to the subgroup sharing the non-common data piece, request the non-common data piece from the second peer via the interface.

19. The method of claim 1, wherein different versions of said data entity are respectively shared amongst different subgroups of the group of peers, wherein each different version has:

the same common data pieces that are shared amongst all peers of the group; and different non-common data pieces that are specific to that version and that are only shared amongst the peers in the corresponding subgroup.

20. A method of sharing different versions of the same item of content amongst different respective subgroups of peers in a peer-to-peer (P2P) network, the method implemented by a first peer in the P2P network and comprising:

receiving a descriptive file that is specific to a first one of the different versions of the item of content, wherein the descriptive file describes different pieces into which the item of content has been subdivided, the descriptive file comprising:

at least one identifier that directly identifies at least one common data piece of the item of content that is common to all versions of the item of content and that is shared amongst all peers in the P2P network;

at least one identifier that does not directly identify any particular piece of the item of content, but rather refers to descriptive data, wherein the descriptive data describes at least one non-common data piece that is specific to the first one of the different versions and that is shared amongst only peers in a first one of the subgroups;

receiving from a second peer in the P2P network a non-common data identifier that indicates to which of the different subgroups the second peer belongs; and determining, based on the non-common data identifier and the descriptive data, whether the second peer belongs to the first subgroup sharing the at least one non-common data piece described by the descriptive file.

* * * * *